United States Patent [19]

Toda

[11] Patent Number: 4,849,981

[45] Date of Patent: * Jul. 18, 1989

[54] HIGH FREQUENCY SIGNAL DRIVER FOR A LASER DIODE AND METHOD OF FORMING SAME

[75] Inventor: Minoru Toda, Lawrenceville, N.J.

[73] Assignee: General Electric Company, Schenectady, N.Y.

[*] Notice: The portion of the term of this patent subsequent to Mar. 14, 2006 has been disclaimed.

[21] Appl. No.: 104,614

[22] Filed: Oct. 5, 1987

[51] Int. Cl.⁴ .............................................. H01P 5/00
[52] U.S. Cl. ..................................... 372/38; 333/24 R
[58] Field of Search ......................... 333/24 R, 35, 33; 372/38, 108

[56] References Cited

U.S. PATENT DOCUMENTS

| Re. 22,374 | 9/1943 | Carter | 333/35 X |
| 2,507,692 | 5/1950 | Collard | 333/35 |
| 3,459,942 | 8/1969 | Anderson | 372/38 |
| 4,314,212 | 2/1982 | Gradl | 333/24 R |
| 4,683,450 | 7/1987 | Max et al. | 333/202 |
| 4,704,630 | 11/1987 | Rodda | 332/206 X |

FOREIGN PATENT DOCUMENTS

| 163683 | 7/1986 | Japan | 372/38 |
| 303732 | 8/1971 | U.S.S.R. | 333/24 R |
| 455492 | 10/1936 | United Kingdom . | |
| 495815 | 11/1938 | United Kingdom . | |
| 522004 | 6/1940 | United Kingdom . | |

OTHER PUBLICATIONS

P. W. Shumate, Jr. et al., "GaAlAs Laser Transmitter for Lightwave Transmission Systems", Bell Sys. Tech. Jour., vol. 57, pp. 1823-1836, 1978.

W. Albrecht et al., IEEE J. Quantum Electronics, vol. QE-18, pp. 1547-1559.

D. W. Bechtle et al., "An Optical Communications Link in the 2.0-6.0 GHz Band", vol. 43, RCA Review, Jun. 1982, pp. 277-309.

F. E. Terman, Radio Engineering, pp. 105, 848-849, McGraw-Hill (1947).

E. V. D. Glazier et al., "The Services Textbook of Radio", vol. 5, Transmission and Propagation, London, HMSO, 1958, pp. 117-123.

Primary Examiner—Eugene R. LaRoche
Assistant Examiner—Benny T. Lee
Attorney, Agent, or Firm—Henry I. Steckler; James C. Davis, Jr.; Paul R. Webb, II

[57] ABSTRACT

The frequency response of a component whose output decreases past a first frequency is extended by employing apparatus which provides for a signal source to be coupled to a component transmission line through a coupling impedance of about zero. The transmission line is resonant at a second frequency greater than the first frequency and the characteristic impedance of the transmission line is selected such that the voltage drop at or near direct current across the component is about equal to the voltage drop across the component at the second frequency. The method of operation comprises providing a signal, forming a transmission line which is resonant at the second frequency and coupling the transmission line to both the component and the signal source. The characteristic impedance of the transmission line is adjusted such that the voltage across the component at or near direct current is about equal to the voltage across the component at the second frequency.

11 Claims, 2 Drawing Sheets

HIGH FREQUENCY SIGNAL DRIVER FOR A LASER DIODE AND METHOD OF FORMING SAME

The invention relates to an apparatus and method for increasing the frequency response of a component whose output decreases at high frequency.

The invention described herein was made in the performance of work under NASA Contract No. NAS 1-17351 and is subject to the provisions of Section 305 of the National Aeronautics and Space Act of 1958 (72 Stat. 435; 42 U.S.C. 2457).

BACKGROUND OF THE INVENTION

Recent trends in high bit rate communication dictate a need for a signal processing system which can operate from direct current (DC) to microwave frequencies. Unfortunately, many components such as circuits, semiconductor devices and in particular, laser diodes, have an output signal which decreases with increasing frequency. For example, laser diodes are typically modeled as a resistance in parallel with a capacitive impedance. Therefore, as the frquency increases, the capacitive impedance decreases which decreases the component input impedance, thus decreasing the applied voltage and the output signal of the device.

Typically, in order to increase the operating frequency, devices would be designed with reduced capacitance. These devices are then mounted such that the length of the lead wires is minimized to reduce any series inductance. Further, since the resistance of the laser diode is typically about 5 ohm ($\Omega$) a resistor of about 45$\Omega$ would be placed in series with the device. This additional resistance provides an impedance match thereby resulting in a low reflection of a transmitted signal when the device is connected to a coaxial cable having a 50$\Omega$ characteristic impedance. Previously, it has been considered necessary to obtain low reflection, and therefore matching, to achieve a flat frequency response from DC to microwave frequencies. M. Toda in U.S. patent application Ser. No. 071104,615, now U.S. Pat. No. 4,813,047, entitled "High Frequency Signal Driver And Method Of Forming Same", filed concurrently herewith, discloses a signal processing system in which a transmission line is coupled between a means for providing a signal and a component. The transmission line is resonant at a frequency such that the peaking effect of the output signal at the resonant frequency compensates for the decrease in the component's output signal, thereby extending the frequency response of the component. In particular a coupling impedance, which is positioned between the signal source and the transmission line, controls the amount of peaking such as to obtain a flat frequency response.

Both the series resistor used for impedance matching in the conventional design and the coupling impedance disclosed by M. Toda generate heat. Typically, this heat generation requires that a laser device package be designed such the resistor is located outside the package so as to readily dissipate the generated heat. However, the requirements of maintaining short lead wires in high frequency devices in combination with the mechanical constraints of laser packages make the use of an outside resistor particularly difficult. Further, this additional resistor reduces the laser's output signal due to resistive losses.

Therefore, it would be desirable to eliminate the use of a resistor and also to extend the frequency response of a component whose output signal decreases at high frequency.

SUMMARY OF THE INVENTION

A signal processing system for obtaining a flat frequency response of a component whose output signal amplitude decreases as frequency increases past a first frequency comprises a signal means for providing a signal which is coupled to a component transmission line. The component transmission line is coupled to the component and a coupling impedance of about zero is positioned between the signal means and the component transmission line. The component transmission line is resonant at a second frequency which is greater than the first frequency and exhibits a characteristic impedance such that the voltage across the component at a low frequency limit is about equal to the voltage across the component at the second frequency. The invention also includes a method for obtaining a flat frequency response for a component whose output decreases past a first frequency. The method comprises forming a transmission line which is resonant at a second frequency greater than the first frequency, providing a signal, coupling the signal to the transmission line and coupling the transmission line to the component. The characteristic impedance of the transmission line is adjusted such that the voltage across the component at a low frequency limit is about equal to the voltage across the component at the second frequency.

It is an object of this invention to increase the frequency response of a component whose output decreases at high frequency.

It is an advantage of this invention that heat producing components are eliminated.

It is a further advantage of this invention that the output of the component is increased.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF PREFERRED EMBODIMENTS

Figure 1:
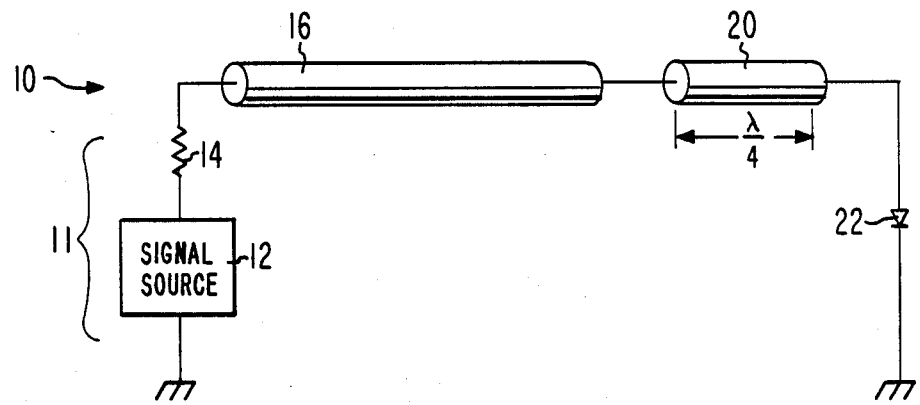
FIG. 1 is a schematic diagram of an embodiment of the invention.

In FIG. 1 a signal processing system 10 comprises a signal means 11 for providing a signal 11 and which typically comprises a signal voltage source 12 and a source matched resistance 14. The source matched resistance 14 is coupled to a source transmission line 16 having a first characteristic impedance $Z_1$. The source transmission line 16 is coupled to a component transmission line 20 this couplin having an impedance of about zero ohms positioned therebetween. The component transmission line 20 has a second characteristic impe- dance $Z_2$ which is less than the first characteristic impedance $Z_1$ and is coupled to a component 22 such as a semiconductor laser diode.

The signal means 11 may comprise the signal voltage source 12 and the source matched impedance 14. The signal voltage source 12 may be any source which provides a signal with a range of frequencies, such as a transistor amplifier to transmit digital or analog signals. The source matched resistance 14 is typically a resistance internal to the signal source and is typically between about 10Ω to 50Ω. Alternatively, the signal means 11 may be a connector or a transmission line which can be coupled to another transmission line which provides the signal.

The source transmission line 16 may be any arbitrary length, including zero, and is typically a metallized strip line formed on a ceramic plate whose metallization, and thereby the first characteristic impedance $Z_1$, may be altered by standard photolithographic and etching techniques. Preferably, the first characteristic impedance $Z_1$ is about equal to the source matched resistance 14. The source transmission line 16 may also be a coaxial cable. It should be understood that additional transmission lines or connectors may be coupled between the signal means 11 and the source transmission line 16.

The component transmission line 20 is initially resonant at a second frequency which is greater than a first frequency at which the output of the component 22 begins to decrease. For a laser diode, the resonant frequency is typically chosen to be between about 1.5 to 3 times greater than the frequency at which the output voltage is at the $-3$ decibel (db) level. This resonance typically results from the length of the component transmission line 20 being about equal to one-quarter of the wavelength ($\lambda$) in the material. For example, the component transmission line 20 will typically be about 1.45 centimeters (cm) for a chosen resonant frequency of about 3.4 gigahertz (GHz) in a transmission line having a propagation velocity of about $1.95 \times 10^8$ meters per second (m/sec). A peaking effect in the output of the component 22 occurs when the frequency of the transmitted signal reaches this resonant frequency. The magnitude of this peaking is determined by the difference between the source impedance of the component transmission line 20 and the second characteristic impedance $Z_2$. When the source impedance of the component transmission and the second characteristic impedance $Z_2$ are about equal, no peaking will occur. As the difference between these impedances becomes greater, the magnitude of the peak also becomes greater until it reaches its maximum amplitude when the source impedance matches the input impedance of the component transmission line 20. The source impedance is the equivalent impedance from the component transmission line 20 toward the signal means 11. When the source matched resistance 14 is approximately equal to the first characteristic impedance $Z_1$, the source impedance of the component transmission line 20 is typically about equal to the value of the first characteristic impedance $Z_1$. The input impedance is the equivalent impedance of the component transmission line 20 toward the component 22. At the resonant frequency, the input impedance is about equal to the square of the second characteristic impedance $Z_2$ divided by a load impedance. The load impedance is typically about equal to the component 22 impedance, although the connections between the component 22 and the component transmission line 20 may also be determined to form the load impedance by techniques well known in the art.

Figure 2:
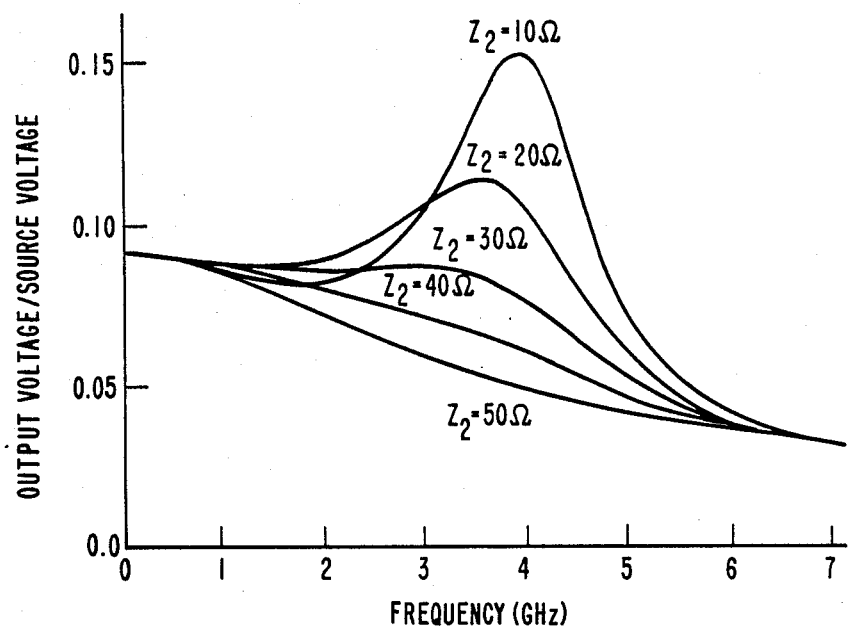
FIG. 2 is an output response curve resulting from the signal processing system of FIG. 1.

Thus, the magnitude of the peaking may be altered by changing the value of the second characteristic impedance $Z_2$ and the length of the component transmission line 20 and if they are chosen correctly the peaking effect will compensate for the decreasing output of the component 22. Typically, the second characteristic impedance $Z_2$ and the length of the component transmission line 20 are chosen by monitoring the output of the component 22 to obtain an approximately flat frequency response. A flat frequency response typically varies less than 30 percent (%) and preferably less than 10%, and typically laser diode is monitored by coupling its output to a PIN photodiode which is connected to a spectrum analyzer. The second characteristic impedance $Z_2$ and the length of the component transmission line 20 may also be determined such that the power to the component 22 at the low frequency limit is about equal to the power to the component 22 at the resonant frequency. The low frequency limit being the low frequency output near direct current, such as between 0 and 50 MHz and preferably direct current, in which other components such as capacitors which decrease the output near direct current are not considered. As shown in FIG. 2, a second characteristic impedance $Z_2$ of about 30Ω results in an approximately flat response to about 3.4 GHz. This flat response is obtained by using a source transmission which has a 50Ω characteristic impedance with a resonant frequency chosen to be about 3.4 GHz and the component transmission line is coupled to a laser diode modeled as a resistance of about 5Ω in parallel with a capacitance of about 15 picofared (pf). Additionally, at the resonant frequency, which is typically between 1 GHz to 10 GHz, the impedance of the component is small and the characteristic impedance of the component transmission line 20 is typically greater than the component 22. Further, the characterisic impedance of the source transmission line 16 is typically greater than the characteristic impedance of the component transmission line 20.

It should be understood that the source and input impedance of the component transmission line 20 are not matched as in conventional quarter-wavelength impedance matching. Typically this impedance matching is considered undesirable when attempting to obtain a flat frequency response from DC to microwave frequencies since a maximum amplitude peak will occur at the resonant frequency thereby making this impedance matching more suitable for narrow bandpass applications. Further, when the component impedance is complex, such as encountered with a resistance in parallel with a capacitance, impedance matching becomes more difficult. Unlike conventional impedance matching having about zero reflection, the source impedance and input impedance of the component transmission line 20 are intentionally mismatched and generally a reflection between about 70% and 80% occurs at the component transmission line 20. The component transmission line 20 is typically a metallized strip line formed on a ceramic plate whose metallization, and thereby the second characteristic impedance $Z_2$, may be altered by standard photolithographic and etching techniques.

Figure 3:
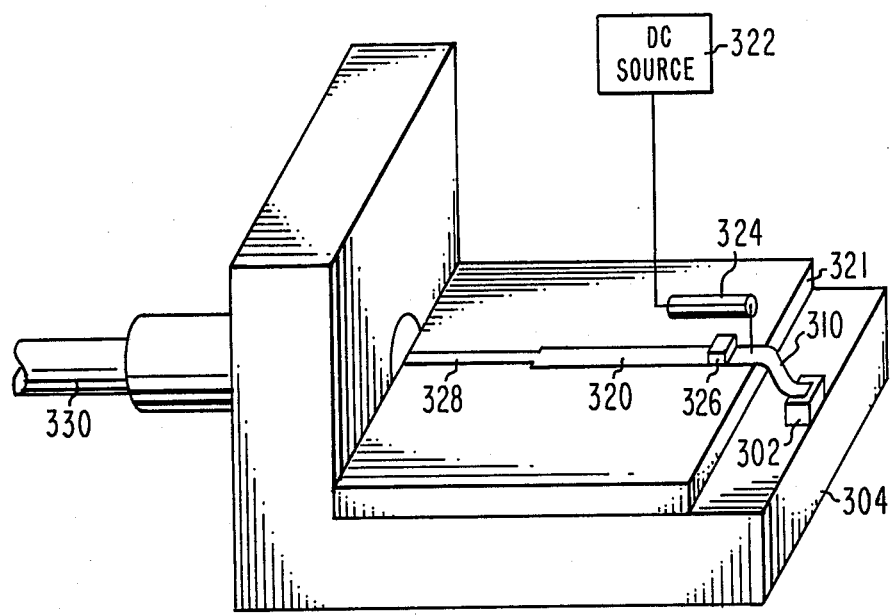
FIG. 3 is a perspective view of a mounted optical signal processing system of the invention.

The component 22 is typically a laser diode which may be modeled as a resistor in parallel with a capacitor. The resistance is typically between about 1Ω to 10Ω and the capacitance is typically between about 5 pf to 200 pf. It should be understood that the invention is equally applicable to other components such as circuits or semiconductors, including transistors, whose output decreases at high frequency. As shown in FIG. 3, a laser 302 is typically mounted such that a first electrical contact is soldered to a header 304 formed of copper. A ribbon wire 110 about 0.5 millimeters (mm) in length connects the component transmission line 320, which is mounted on a ceramic plate 321 to a second electrical contact of the laser 302. A DC source 322 for biasing the laser is coupled to a choke 324 which is connected to the component transmission line 320. A DC blocking capacitor 326 is also positioned on the component transmission line 320. The signal is delivered to the source transmission line 328 through a coaxial cable 330, and the source transmission line, in turn is coupled to a component transmission line 320. It should be understood that in a communication system the length of the source transmission line 16, shown in FIG. 1, may be zero and the signal means 11, such as a transistor amplifier, may be directly connected to the component transmission line 20.

In operation, as depicted in FIG. 1, the signal source 12 provides a signal which may extend between the DC and microwave frequencies. This signal passes through the source transmission line 16 and through the component transmission line 20 to component 22. As the signal source increases in frequency, the output of the component 22 decreases. This decrease in output is compensated by the peaking effect of the quarter-wavelength component transmission line 20. The proper amount of peaking is controlled by selecting the length and the characteristic impedance of the component transmission line such that the voltage across the component at the low frequency limit is about equal to the voltage across the component at the resonant frequency. Therefore, a flat frequency response is obtained even though an impedance mismatch occurs between the component transmission line 20 and the component 22 since the amount of reflection remains approximately constant at all frequencies. It should be understood that since the source matched impedance 14 is approximately equal to the first characteristic impedance $Z_1$, an additional resonant or spurious peaks in the signal output are not formed since all the reflection from the load is absorbed by the source matched resistance 14.

The present invention significantly extends the flat frequency response of a component, such as a laser diode, while simplifying package design, increasing output signal amplitude, and reducing heat dissipation by eliminating a resistance. Further, the phase characteristics are approximately linear and therefore any digital information transmitted will not be significantly altered.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

I claim:

1. A signal processing apparatus coupled to a component for applying a voltage across said component, said component having an impedance and whose output decrease when the frequency of an input signal increases past a first frequency, said apparatus comprising:
   signal means for providing said input signal;
   a component transmission line resonant at a second frequency greater than said first frequency; and
   a coupling impedance of about zero ohms coupled between said signal means and said component transmission line, said component transmission line being coupled to said component and having a characteristic impedance of a value such that the voltage across the component at a selected low frequency limit is about equal to the voltage across the component at said second frequency;
   wherein said second frequency is between about 1.5 to 3 times greater than the frequency at which the output of said component is at the −3 decibel level with respect to the output of said component at direct current.

2. The signal processing apparatus of claim 1 wherein said component comprises a semiconductor laser diode.

3. The signal processing apparatus of claim 1 wherein the characteristic impedance of said component transmission line is greater than the impedance of said component of said second frequency.

4. The signal processing apparatus of claim 1 wherein said signal means comprises a signal source having a source matched resistance.

5. The signal processing apparatus of claim 4 wherein said signal source is only coupled to a source transmission line having a characteristic impedance and the source transmission line is only coupled to said component transmission line.

6. The signal processing apparatus of claim 5 wherein the characteristic impedance of said source transmission line is about equal to said source matched resistance.

7. A method for extending the flat frequency response of a component having a voltage thereacross and whose output signal amplitude decreases as the frequency of the output signal increases past a first frequency, said method comprising the steps of:
   providing an input signal from a source;
   forming a component transmission line which is resonant at a second frequency which is greater than said first frequency and which second frequency is between about 1.5 to 3 times greater than the frequency at which the output of said component is at the −3 decibel level with respect to the output of said component at direct current;
   coupling said input signal to the component transmission line through a coupling impedance of about zero ohms;
   coupling said component transmission line to the component; and
   selecting the characteristic impedance of said component transmission line such that the voltage across the component at a selected low frequency limit is about equal to the voltage across the component at said second frequency.

8. The method of claim 7 wherein said selecting step comprises selecting the length and the characteristic impedance of said component transmission line such that the output signal of the component is about flat between direct current and said second frequency.

9. The method of claim 8 wherein said selecting step comprises selecting the length and characteristic impedance of said component transmission line such that said output signal varies less than 30% in amplitude between DC and said second frequency.

10. The method of claim 8 wherein said selecting step comprises selecting the length and characteristic impedance of said component transmission line such that said output signal varies less than 10% in amplitude between DC and said second frequency.

11. The method of claim 10 wherein said selecting step comprises selecting the impedance of said source and the input impedance of said component transmission line to be sufficiently mismatched to achieve a reflection between about 70% and 80% of the amplitude of said input signal at said component transmission line.

* * * * *